Nov. 8, 1966  J. H. STEWARD ET AL  3,283,794

CLIP NUT

Filed Oct. 29, 1964

INVENTORS
JERRY H. STEWARD
FRANK W. KRING
BY Wilson, Settle &
Craig
ATTORNEYS ns patent office 3,283,794
Patented Nov. 8, 1966

3,283,794
CLIP NUT
Jerry H. Steward, Bloomfield Hills, and Frank W. Kring, Detroit, Mich., assignors to Multifastener Corporation, Detroit, Mich., a corporation of Michigan
Filed Oct. 29, 1964, Ser. No. 407,318
10 Claims. (Cl. 151—41.75)

This invention relates to clip nuts, and more particularly to an improved form of clip nut and a method for making the improved clip nut.

At the present time, clip nuts are widely employed in the automotive industry for fastening sheet metal panels to each other where, for various reasons, one side of the assembled panel is inaccessible to the extent that a nut cannot be positioned and held during a bolt threading and tightening operation. To position the nut, the nut is mounted in a sheet metal clip of U or J shape which is supported and retained by a panel edge or by a slot cut through the panel for this specific purpose. The clip functions to position the nut in alignment with a hole in the panel and to hold the nut against rotation while the bolt is being driven into the nut from the accessible side of the panel assembly.

Once the bolt has been tightened in the nut, the clip functions only as a washer and, thus, its structural requirements insofar as strength is concerned is that it must hold the nut against axial movement until the thread of a power driven bolt can be caught in the nut and then hold the nut against rotation as the bolt is tightened.

From the practical standpoint, the clip need be made only strong enough to meet the foregoing structural requirements and because of the tremendous number of clip nuts employed, it is obvious that economic considerations require the clip to be constructed from the minimum amount of metal which will meet the structural requirements. In addition to the obvious reduction in cost of material which will be achieved by minimizing the amount of material employed in each individual clip, the clip of the clip nut is normally made in a progressive die from a steel which is subsequently heat treated after the completion of the nut to increase its strength. Heat treatment costs are directly proportional to the weight of the material treated, and the saving of the fraction of an ounce on an individual clip nut becomes substantial when reflected in terms of millions of individual units.

Accordingly, it is an object of the present invention to provide a clip nut and method of making the nut wherein satisfactory structural properties are achieved with the use of a minimum amount of material.

Other objects and features of the invention will become apparent by reference to the following specification and to the drawings.

Figure 2:
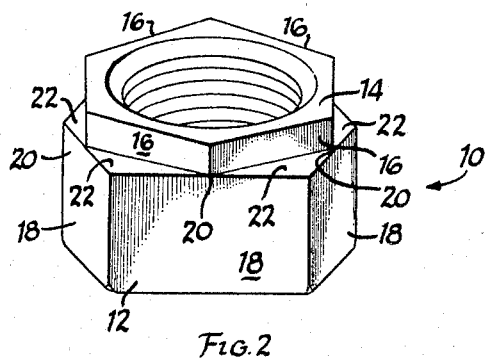
FIGURE 2 is a perspective view of the nut.
Figure 3:
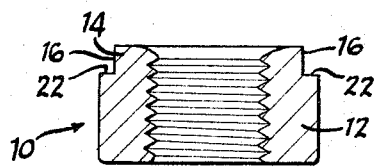
FIGURE 3 is a detail cross sectional view of the nut of FIGURE 2 taken across opposite corners of the lower or body portion of the nut.

Referring first to FIGURE 2, a clip nut embodying the present invention is manufactured by assembling a nut blank designated generally 10 into a metallic strip in a progressive die operation. As best seen in FIGURES 2 and 3, the nut blank 10 includes a hexagonal body portion 12 having a hexagonal pilot portion 14 formed at one axial end of the body. The sides 16 of pilot portion 14 are angularly offset 30° about the axis of the nut from the sides 18 of the body portion and extend between midpoints 20 of the sides 18 of body portion 12. Thus, a series of flat, triangular shoulders 22 are formed on nut body 12 at its juncture with the pilot portion 14.

Nut blank 10 may be formed by cold forming the pilot portion 14 on one side of a standard heavy series hexagonal nut. The axial length of pilot portion 14 is selected to be substantially greater than the thickness of the metallic strip in which it is to be mounted and is preferably of a length between two and three times that of the thickness of the metallic strip from which the clip is formed. As best seen in FIGURE 3, the radial thickness of the pilot portion is fairly substantial to provide sufficient metal for the staking operation to be described below.

Figure 1:
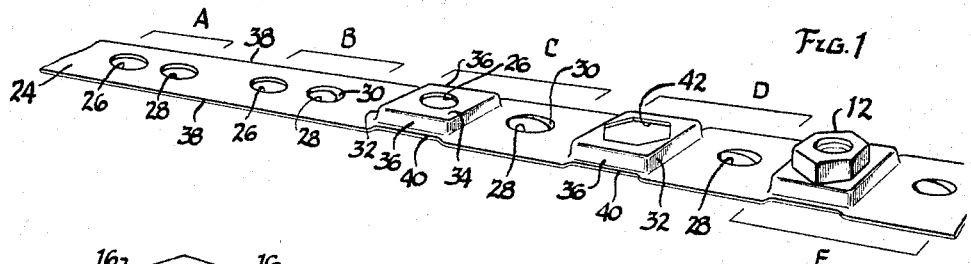
FIGURE 1 is a perspective view of a metallic strip showing the sequence of operations in the manufacture of a nut embodying the invention in a progressive die.

Referring now to FIGURE 1, there is shown a length of metallic strip 24 illustrating five successive steps or operations in the formation of a clip nut in a progressive die. The progressive steps are bracketed at reference numerals A, B, C, D and E, respectively. As shown in FIGURE 1, the metal strip is upside down from its actual orientation in the progressive die for purposes of clarity.

At station A, two circular holes 26 and 28 are punched in the strip. At station B, a locating lip 30 is formed around half of the periphery of the hole 28. At station C, a rectangular embossment, designated generally 32, is formed in the metallic strip, hole 26 being centered in the embossment. The embossment is formed with a flat crown 34 which is in parallel offset relationship to the general plane of strip 24 and two opposed sides 36 of the embossment extend in adjacent parallel relationship to the side edges 38 of the strip. In the formation of the embossment, the offsetting or displacement of the metal of the strip causes a slight concave deformation 40 in the side edges of the strip.

At the next station, station D, an enlarged hexagonal opening 42 is punched concentric with opening 26. Two opposed sides of hexagonal opening extend parallel to the side edges 36 of embossment 32, the size of opening 42 is slightly greater than that of pilot portion 14, so that pilot portion 14 can be received, with a slight clearance, within opening 42.

At station E, a nut blank has been located in opening 42 by inserting the pilot portion 14 of the nut downwardly, as viewed in FIGURE 1, through opening 42. The triangular shoulders 22 on the nut body 12 engage the convex side of embossment 32, while the pilot portion projects downwardly beyond the convex (lower surface as viewed in FIGURE 1) side of embossment 32.

The next step in the formation of the clip nut is the staking of the projecting portion of the nut pilot to the concave side of metallic strip 24. The staking operation may be performed at station E, or station E may be employed solely as a feeding station, and the staking operation performed at the next subsequent station, not indicated in FIGURE 1.

Figure 5:
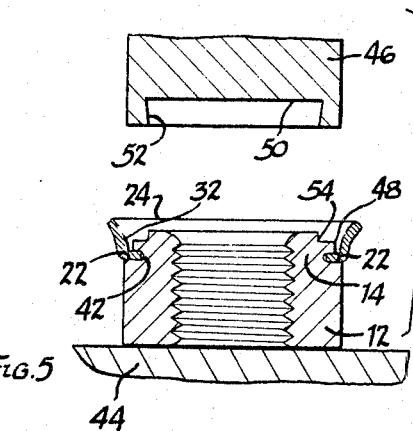
FIGURE 5 is a cross sectional view of the nut as staked to the metallic strip, showing a cross section of the die employed in the staking operation.

The staking operation is best visualized from FIGURE 5. The nut body 12 is supported upon a fixed backup member or anvil 44 with pilot 14 projecting upwardly through opening 42 and shoulders 22 engaging the convex side of embossment 32. A die member 46 schematically illustrated in FIGURE 5 is then driven downwardly to stake the projecting pilot portion to the concave side of embossment 32 by forcing metal from the pilot portion outwardly over and beyond the edges of opening 42 to create a retaining flange, as at 48. Die member 46 is formed with a circular recess 50 having a diameter which is greater than the major diameter of the nut threads but less than the diameter of an imaginary inscribed circle tangent to the sides of pilot portion 14 prior to the staking operation. The side wall 52 of circular recess 50 of the die is preferably formed with a reverse taper to facilitate withdrawal of the die from the pilot portion at the conclusion of the staking operation.

The diameter of circular recess 50 and the depth or axial dimension of the annular shoulder 54 formed in the staking are selected in accordance with the original clearance between opening 42 and the pilot portion. Ideally, it is desired at the conclusion of the staking operation to expand the sides of the pilot portion radially into contact with the sides of the opening 42 but to have little or no radial pressure exerted by the pilot portion against the sides of opening 42. This is because the completed clip nuts are heat treated after assembly, and radial pressure of the nut pilot against the sides of opening 42 will create undesirable stresses in the metal of the clip during the heat treat. At the same time, for torque resistance, it is obviously desirable to have as great an area of contact between the pilot portion and sides of opening 42. It will be appreciated that due to the manufacturing tolerances of the nut blanks, the ideal situation cannot always be achieved, but the axial stroke and recess diameter of the die are chosen in terms of the average nut dimension.

Figure 4:
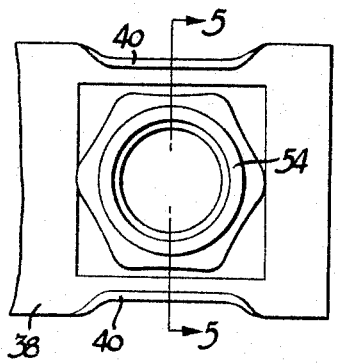
FIGURE 4 is a detail elevation showing the pilot portion staked to the metallic strip, and corresponding to a section taken on line 4—4 of FIGURE 7.

At the conclusion of the staking operation, the stake pilot portion has the appearance shown in FIGURE 4. The original hexagonal shape of the pilot portion is now somewhat distorted in that the corners are somewhat expanded because the die by virtue of its circular recess displaces a greater volume of metal in the corners of the pilot portion than along the sides.

It is desirable that the diameter of circular opening 50 exceed the major diameter of the nut thread by a reasonable amount to avoid distortion of the nut threads, because in the completed clip nut the bolt is always inserted into the nut from the pilot portion end of the nut. Thus, any distortion of the threads at the pilot portion end of the nut interferes with the threading of the bolt into the nut.

Figure 7:
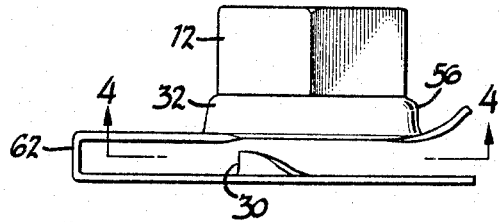
FIGURE 7 is a side elevational view of the completed clip nut.

After the nut has been staked to the metal clip, the strip is cut and bent into the U-shaped formation best seen in FIGURE 7.

The foregoing structure achieves several advantages particularly in the achievement of a clip nut in which the desired degree of strength is achieved by the employment of a minimum amount of metal. This is important from the economic standpoint, because such nuts are manufactured in extremely large quantities. In addition to the obvious desirability of reducing the raw material cost, heat treatment costs are directly proportional to the weight of the articles treated, and the difference of a fraction of an ounce per unit becomes a substantial factor when considered in terms of millions of units.

Features of primary importance in achieving high strength from a minimum amount of material include the formation of the embossment in a rectangular shape. While the embossment shown in the drawings is square, in practice, the location and orientation of only three sides, sides 36 and side 56 (FIGURES 6 and 7) are of significance. By extending sides 36 parallel to the side edge of the strip, maximum employment of the full width of the strip is achieved. Further, by having two opposed sides of hexagonal opening 42 extending parallel to sides 36 of the embossment, the dimension of the embossment between the opposed sides 36 can be minimized. The location of the sides and corners of opening 42 can be visualized in FIGURE 6, because, in practice in the staking operation, the corners of openings 42 are slightly enlarged as at 58 and protrude somewhat beyond the sides of the nut body. Because the distance across the flats of a hexagon is obviously less than the distance across opposite corners, the orientation of the sides of opening 42 parallel to the side edges of the metallic strip permits a minimum overall width of the strip while retaining a given distance between the edge or point of closest approach of opening 42 to the edge of the strip.

Figure 6:
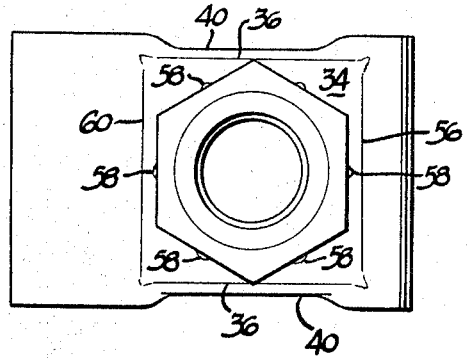
FIGURE 6 is a top plan view of a completed clip nut.

As indicated in FIGURE 6, a corner of opening 42 is located adjacent front edge 56. However, this corner is in a flat portion of crown 34 immediately before the crown curves downwardly to define edge 56. The curve along the upper edge of edge 56 increases the strength of the metal in this region. By having a flat portion of the nut body extend parallel to edge 56, the axis of the nut threads can be located closer to edge 56 than if a corner nut body were to be located in this region. Thus, the arrangement disclosed permits the use of a minimum amount of metal to the right of the axis of the nut threads as viewed in FIGURES 6 and 7.

The exact location of the remaining edge 60 of the embossment is not overly critical, because it is located well away from any critical edge or surface of the clip body. The spacing between the base 62 of the clip and the nut axis is usually standardized to provide a range of spacing of the nut axis inwardly from the edge of a panel on which the nut is to be clipped.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

We claim:

1. In a method of making a clip nut; the steps of forming a hexagonal pilot portion on one end of a hexagonal nut body with the sides of the pilot portion extending substantially to and between the midpoints of the sides of the nut body, forming in a metal strip an embossment having a flat crown offset from the general plane of the strip and having parallel opposite sides extending in adjacent parallel relationship with the side edges of the strip, forming a hexagonal opening in the crown of said embossment adapted to receive said pilot portion with two opposed side edges of said hexagonal opening extending in adjacent parallel relationship to said opposite sides of said embossment, seating a nut body upon the convex side of the crown of said embossment with the pilot portion projecting through said hexagonal opening, and staking the pilot portion to the concave side of said crown.

2. In a method of making a clip nut, the steps of forming a hexagonal pilot portion of a preselected axial length on one end of a hexagonal nut body with the sides of the pilot portion extending substanitally to and between the midpoints of the sides of the body, forming in a metal strip of a thickness less than the axial length of said pilot portion and embossment having a flat crown offset from the general plane of the strip by a distance greater than said axial length of said pilot portion, forming said embossment with parallel opposite sides extending in adjacent parallel relationship with the side edges of the strip, forming a hexagonal opening adapted to receive said pilot portion through the crown of said embossment with two opposed side edges of said hexagonal opening extending in adjacent parallel relationship to said opposite sides of said embossment, seating said nut body upon the convex side of the crown of said embossment with said pilot portion received in and projecting through said opening, and staking the pilot portion to the concave side of said crown.

3. In a method of making a clip nut; the steps of forming a hexagonal pilot portion on one end of a hexagonal threaded nut body with the sides of the pilot portion extending substantially to and between the midpoints of the sides of the body, forming in a metal strip an embossment having a flat crown offset from the general plane of the strip and parallel opposite side edges extending in adjacent parallel relationship with the side edges of the strip, forming a hexagonal opening adapted to receive said pilot portion through the crown of said embossment with two opposed side edges of said hexagonal opening extending in adjacent parallel relationship to said opposite side edges of said embossment, seating said nut body upon the convex side of the crown of said embossment with said pilot portion projection through said opening, and striking the pilot portion axially with a die having a circular recess therein axially aligned with the axis of the nut threads and having a diameter greater than the major nut thread diameter and less than that of an imaginary inscribed circle tangent to the side edges of the hexagonal pilot portion to stake the pilot portion to the concave side of said crown.

4. In a method as defined in claim 3, the further improvement wherein said hexagonal opening is formed to a size adapted to receive said hexagonal pilot portion with a slight clearance, and regulating the axial penetration of said die into said pilot portion in said striking step to expand the sides of said pilot portion radially within said opening into light contact with the sides of said opening and to form a retaining flange projecting radially outwardly beyond the edges of said hexagonal opening.

5. In a clip nut assembly having a sheet metal clip with parallel opposite side edges; means defining a rectangular embossment on said clip having opposed first sides extending in adjacent parallel relationship to the opposed side edges of said clip, said embossment having a flat crown offset from the general plane of said clip and having a hexagonal opening extending centrally through said crown with two opposite side edges of said opening extending in adjacent inwardly spaced parallel relationship to said first sides of said embossment, a nut having a hexagonal body and an integral hexagonal pilot portion projecting axially from one end of said body, the sides of said pilot portion extending substantially to and between the midpoints of the sides of the body and being adapted to be received within said opening, said nut body being seated on the outer side surface of said crown with said pilot portion projecting through said hexagonal opening beyond the inner side of said crown, the projecting portion of said pilot being staked to the inner side of said crown.

6. In a clip nut assembly having a sheet metal clip with parallel opposite side edges; means defining a rectangular embossment on said clip having opposed first sides extending in adjacent parallel relationship to the opposed side edges of said clip, said embossment having a flat crown offset from the general plane of said clip and having a hexagonal opening extending centrally through said crown with two opposite side edges of said opening extending in adjacent inwardly spaced parallel relationship to said first sides of said embossment, a threaded nut having a hexagonal body and an integral hexagonal pilot portion projecting axially from one end of said body, the sides of said pilot portion extending substantially to and between the midpoints of the sides of the body and being adapted to be received within said opening, said nut body being seated on the outer side of said crown with said pilot portion projecting through said hexagonal opening beyond the inner side of said crown, the projecting portion of said pilot having a staked flange projecting radially outwardly beyond the edges of said opening in face-to-face engagement with the inner side of said crown, and an annular projection of a diameter greater than the major thread diameter of said nut projecting axially beyond the side of said flange remote from said inner side of said crown.

7. In a clip nut assembly having a sheet metal clip with parallel opposite side edges; means defining a rectangular embossment on said clip having opposed first sides extending in adjacent parallel relationship to the opposed side edges of said clip, said embossment having a flat crown offset outwardly from the general plane of said clip and having a hexagonal opening extending centrally through said crown with two opposite side edges of said opening extending in adjacent inwardly spaced parallel relationship to said first sides of said embossment, a nut having a hexagonal body axially engaged with the outer side of said crown and an integral hexagonal pilot portion coaxial with said body fitted within and projecting axially from said body through said opening, the sides of said pilot portion being angularly offset about the nut axis from the sides of the body to extend substantially to and between the midpoints of the sides of the body, said pilot portion projecting through said hexagonal opening beyond the inner side of said crown by a distance less than the outward offset of said crown from the general plane of said clip to terminate in a reduced diameter annular end portion, and a staked flange projecting radially outwardly from said end portion beyond the sides of said opening in face-to-face engagement with the inner side of said crown.

8. In a clip nut having a sheet metal clip with parallel side edges; means defining a rectangular embossment projecting outwardly from one side surface of said clip, said embossment having opposed first sides extending in adjacent parallel relationship to the opposed side edges of said clip, means defining a hexagonal opening through said embossment having two opposite side edges extending in adjacent inwardly spaced parallel relationship to said first sides of said embossment, a nut having a hexagonal body and a hexagonal pilot portion adapted to be received within said opening projecting axially from one end of said body by a distance greater than the thickness of the sheet metal of said clip, the sides of said pilot portion extending substantially to and between the midpoints of the sides of the nut body, said nut body being axially engaged against the convex side surface of said embossment with said pilot portion projecting inwardly through said hexagonal opening and having its inner end staked over the inner concave side surface of said embossment to secure said nut to said clip.

9. In a clip nut having a sheet metal clip with parallel side edges; means defining a rectangular embossment having a flat crown projected outwardly from one side surface of said clip, said embossment having opposed first sides extending in adjacent parallel relationship to the opposed side edges of said clip and a third side extending in adjacent parallel relationship to an end of said clip, means defining a hexagonal opening through said crown of said embossment having two opposite side edges extending in adjacent inwardly spaced parallel relationship to said first sides of said embossment and a corner between said opposite edges located in said crown in adjacent spaced relationship to said third edge, a nut having a hexagonal body having one end seated on the outer side of said crown and an integral coaxial hexagonal pilot portion projecting axially from said one end of said body through said opening and beyond the inner side of said crown, the sides of said pilot portion being angularly offset from the sides of the body to extend from midpoint to midpoint of the sides of the nut body, said pilot portion having its projecting inner end staked over the inner concave side surface of said embossment to secure said nut to said clip.

10. A nut blank adapted to be staked to a sheet metal clip or the like comprising a nut body of hexagonal transverse cross section symmetrical about a longitudinally extending nut axis, an integral pilot of hexagonal transverse cross section symmetrical about said axis extending axially from one end of said body, the distance across the corners of said pilot being substantially equal to the distance across the flats of said body and angularly offset about the nut axis from the sides of said body by an angle of 30° to define a series of triangular shoulders at said one end of said body, and means defining a threaded bore extending entirely through said body and pilot coaxially of said nut axis, said bore having a major thread diameter substantially less than the diameter of an imaginary inscribed circle tangent to the sides of said pilot to permit axial deformation of that portion of said pilot located radially outwardly of a circle of a diameter less than that of said inscribed circle without deformation of said threaded bore.

References Cited by the Examiner

UNITED STATES PATENTS

| | | | |
|---|---|---|---|
| 1,759,339 | 5/1930 | Andren | 151—41.72 |
| 2,278,790 | 4/1942 | Langmaid | 151—41.75 |
| 2,707,507 | 5/1955 | Tripp et al. | 151—41.7 |

CARL W. TOMLIN, *Primary Examiner.*

M. PARSONS, Jr., *Assistant Examiner.*